United States Patent [19]

Senuma et al.

[11] Patent Number: 5,037,887
[45] Date of Patent: Aug. 6, 1991

[54] CROSSLINKABLE COMPOSITION

[75] Inventors: Akitaka Senuma, Yokohama; Toshiyuki Nagai, Ayase; Kiroku Tsukada; Akio Hayashi, both of Yokohama; Isao Noda, Yokosuka, all of Japan

[73] Assignee: Nippon Unicar Company Limited, Danbury, Conn.

[21] Appl. No.: 386,212

[22] Filed: Jul. 28, 1989

[30] Foreign Application Priority Data

Aug. 23, 1988 [JP] Japan .................. 63-207221

[51] Int. Cl.$^5$ ............................ C08L 83/07
[52] U.S. Cl. .................... 525/106; 525/100; 525/104; 525/105; 525/453; 525/455; 525/446; 525/445; 525/464; 428/447
[58] Field of Search ............ 525/100, 106, 209, 288, 525/103, 104, 105, 106, 453, 455, 446, 445, 464; 524/269, 264, 267; 428/447

[56] References Cited

U.S. PATENT DOCUMENTS

| | | | |
|---|---|---|---|
| 2,888,419 | 5/1959 | Safford | 260/29.1 |
| 3,227,777 | 1/1966 | Safford | 525/209 |
| 3,415,900 | 12/1968 | Robh | 525/104 |
| 3,663,649 | 5/1972 | Wheeler | 525/209 |
| 3,836,560 | 9/1974 | Prokai et al. | 260/448.8 R |
| 3,865,897 | 2/1975 | Falender et al. | 525/106 |
| 4,242,466 | 12/1980 | Schilling et al. | 521/112 |

FOREIGN PATENT DOCUMENTS 1294986 11/1972 United Kingdom .

Primary Examiner—John C. Bleutge
Assistant Examiner—R. Dean, Jr.
Attorney, Agent, or Firm—Saul R. Bresch

[57] ABSTRACT

A composition comprising:
(i) a crosslinkable thermoplastic resin;
(ii) an organic peroxide crosslinking agent; and
(iii) a linear polyorganosiloxane having the following recurring unit:

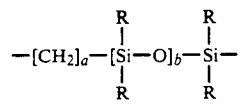

wherein
R is a saturated aliphatic or aromatic group and each R can be alike or different;
a is about 5 to about 100;
b is about 1 to about 1000; and
the polyorganosiloxane is terminated at the [CH$_2$]$_a$ end with —CH=CH$_2$ or hydrogen and at the

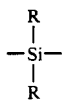

end with—[CH$_2$]$_a$—CH=CH$_2$ or hydrogen provided that at least one —CH=CH$_2$ is present.

12 Claims, No Drawings

CROSSLINKABLE COMPOSITION

TECHNICAL FIELD

This invention relates to a crosslinkable composition containing a thermoplastic resin, a polyorganosiloxane, and an organic peroxide, useful in various extrusion and molding applications.

BACKGROUND ART

Silicones have been widely used in various applications because of well known properties such as slip, mold release, oxygen permeability, water repellency, and electrical insulating. Insofar as extrusion and molding processes are concerned, however, the silicones have several drawbacks. One deficiency is low mechanical strength; another is the difficulty of forming the silicone into film; still another is poor moldability.

DISCLOSURE OF THE INVENTION

An object of this invention, therefore, is to provide an extrudable/moldable composition, which takes advantage of the strong points of the silicones, and overcomes the drawbacks.

Other objects and advantages will become apparent hereinafter.

According to the present invention, the above object is met by a composition comprising:
(i) a crosslinkable thermoplastic resin;
(ii) an organic peroxide crosslinking agent; and
(iii) a linear polyorganosiloxane having the following recurring unit:

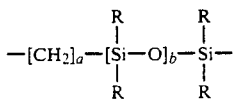

wherein
R is a saturated aliphatic or aromatic group and each R can be alike or different;
a is about 5 to about 100;
b is about 1 to about 1000; and
the polyorganosiloxane is terminated at the $[CH_2]_a$ end with $-CH=CH_2$ or hydrogen and at the

end with $-[CH_2]_a-CH=CH_2$ or hydrogen provided that at least one $-CH=CH_2$ is present.

DETAILED DESCRIPTION

The thermoplastic resin can be any cross-linkable homopolymer or copolymer produced from two or more comonomers, or a blend of two or more of these polymers, conventionally used in film, sheet, and tubing, and as jacketing and/or insulating materials in wire and cable applications. Generally, the monomers useful in the production of these homopolymers and copolymers will have 2 to 20 carbon atoms. Examples of such monomers are alpha-olefins such as ethylene, propylene, 1 butene, 1 hexene, 4-methyl-1-pentene, and 1 octene; unsaturated esters such as vinyl acetate, ethyl acrylate, methyl acrylate, methyl methacrylate, t-butyl acrylate, n-butyl acrylate, n-butyl methacrylate, 2-ethlyhexyl acrylate, and other alkyl acrylates; diolefins such as 1,4-pentadiene, 1,3-hexadiene, 1,5-hexadiene, 1,4-octadiene, and ethylidene norbornene; other monomers such as styrene, p-methyl styrene, alphamethyl styrene, p-chloro styrene, vinyl naphthalene, and similar aryl olefins; nitriles such as acrylonitrile, methacrylonitrile, and alphachloroacrylonitrile; vinyl methyl ketone, vinyl methyl ether, vinylidene chloride, maleic anhydride, vinyl chloride, vinylidene chloride, vinyl alcohol tetrafluoroethylene, and chlorotrifluoroethylene; and acrylic acid, methacrylic acid, and other similar unsaturated acids.

The homopolymers and copolymers referred to can be non-halogenated, or halogenated in a conventional manner, generally with chlorine or bromine. Examples of halogenated polymers are polyvinyl chloride, polyvinylidene chloride, and polytetrafluoroethylene. In addition to polyolefins, included among the polymers can be polyesters, polycarbonates, and polyurethanes. The homopolymers and copolymers of ethylene are preferred, both in the non-halogenated and halogenated form. Included in this preferred group are terpolymers such as ethylene/propylene/diene monomer rubbers.

The organic peroxide crosslinking agent used in the composition of this invention preferably has a decomposition temperature of 100° to 220° C. for a half-life of 10 minutes and is exemplified by the following compounds (the numbers set off by the parentheses are the decomposition temperatures (° C.)): succinic acid peroxide (110), benzoyl perioxide (100), t-butyl peroxy-2-ethyl hexanoate (113), p-chlorobenzoyl peroxide (115), t-butyl peroxy isobutylate (115), t-butyl peroxy isopropyl carbonate (135), t-butyl peroxy laurate (140), 2,5-dimethyl-2,5-di(benzoyl peroxy)hexane (140), t-butyl peroxy acetate (140), di-t-butyl diperoxy phthalate (140), t-butyl peroxy maleic acid (140), cyclohexanone peroxide (145), t-butyl peroxy benzoate (145), dicumyl peroxide (150), 2,5-dimethyl-2,5-di(t-butyl peroxy)hexane (155), t-butyl cumyl peroxide (155), t-butyl hydroperoxide (158), di-t-butyl peroxide (160), 2,5-dimethyl-2,5-di(t-butyl peroxy)hexane- 3 (170), di-isopropyl benzene hydroperoxide (170), p-menthane hydroperoxide (180), and 2,5-dimethyl hexane-2,5-dihydroperoxide (213).

The linear polyorganosiloxane is described above as component (iii). R, a hydrocarbyl group, can have 1 to 10 carbon atoms, and preferably has 1 to 6 carbon atoms. The hydrocarbyl group can be a saturated aliphatic or aromatic group, e.g., methyl, ethyl, propyl, isopropyl, butyl, isobutyl, benzyl, phenyl, tolyl, xylyl, phenethyl, and naphthyl.

The subscript a can be about 5 to about 100 and is preferably about 8 to about 13. The subscript b can be about 1 to about 1000 and is preferably about 8 to about 200. The polysiloxane is terminated with at least one vinyl group, preferably with a vinyl group at either end.

For each 100 parts by weight of thermoplastic resin, the composition can contain (a) about 0.1 to about 10 parts by weight of organic peroxide crosslinking agent and preferably about 0.5 to about 3 parts by weight, and (b) about 0.01 to about 300 parts by weight of polyorganosiloxane and preferably about 0.05 to about 100 parts by weight.

The number of recurring units in the polyorganosiloxane can be in the range of about 1 to about 2 and is preferably in the range of about 1.5 to about 2. The molecular weight of the polyorganosiloxane lies in the range of about 330 to about 74,000, and preferably in the range of about 1000 to about 10,000. The viscosity can be in the range of about 1 to about 30,000 centistokes at 25° C. and is preferably in the range of about 10 to about 1000 centistokes at 25° C.

The polyorganosiloxane can be prepared by reacting the following organopolysiloxane:

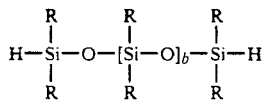

with a straight chain diene having the following formula:

$$CH_2=CH-(CH_2)_a-CH=CH_2$$

in the presence of a catalyst. R, a, and b are as above. The dienes with a vinyl group on each end are exemplified by 1,5 hexadiene, 1,6-heptadiene, 1,7-octadiene, 1,8-nonadiene, 1,9-decadiene, 1,10-undecadiene, 1,11-dodecadiene, 1,12-tridecadiene, and 1,13 tetradecadiene.

The catalyst can be chloroplatinic acid or platinum supported on an inert carrier such as silica or alumina. Solvents are not essential to the reaction, but in the case where one of the reactants is not soluble in the other reactant, an inert solvent such as benzene, toluene, or hexane can be used.

The organopolysiloxane, diene, catalyst, and a solvent, if required, are loaded into a reactor under an inert atmosphere such as nitrogen, mixed, and heated to a temperature in the range of about 60° C. to about 90° C. The reaction is continued until the viscosity stops increasing. The reaction product is then neutralized and purified to provide the polyorganosiloxane for the composition of the invention. When the organopolysiloxane is added in a larger equivalent then the diene, the reaction product has a higher proportion of Si—H groups. Conversely, the reaction with a smaller equivalent than the diene produces a polyorganosiloxane with a higher proportion of vinyl end groups. The amounts of various components introduced into the reactor are, generally, about as follows:

| component | parts by weight | |
| --- | --- | --- |
| | broad range | preferred range |
| organopolysiloxane | 50 to 90 | 60 to 80 |
| diene | 10 to 40 | 20 to 30 |
| catalyst | 0.001 to 0.01 | 0.003 to 0.005 |
| solvent | 0 to 50 | 10 to 30 |

Useful additives for subject composition are coupling agents, surfactants, reinforcing filler or polymer additives, antioxidants, ultraviolet stabilizers, antistatic agents, pigments, dyes, slip agents, plasticizers, lubricants, viscosity control agents, extender oils, metal deactivators, water tree growth retardants, voltage stabilizers, flame retardant additives, and smoke suppressants.

Subject composition is usually heat-kneaded to make it homogeneous and prepare it for forming, i.e., for extruding or molding, into film, sheet, tubing, and other articles of manufacture. The heat-kneading can be conducted in a Banbury mixer, a twin screw extruder, or in other conventional kneading apparatus. The kneading temperature is preferably in the range of about 100° to about 300° C. The forming equipment is also conventional.

The invention is illustrated by the following examples.

EXAMPLE 1

A polyorganosiloxane is prepared from 100 parts by weight of an organopolysiloxane having the formula:

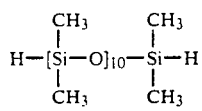

and 18 parts by weight of 1, 9-decadiene according to the process described above.

The resultant polyorganosiloxane is terminated with a vinyl group on each end and has a viscosity of 6000 centistokes at 25° C.

A mixture of 100 parts by weight of an ethylene/vinyl acetate copolymer having a melt index of 2.5 grams per 10 minutes and a vinyl acetate content of 19 percent by weight based on the weight of the copolymer; 40 parts by weight of the above prepared polyorganosiloxane; 2 parts by weight dicumyl peroxide; and 0.1 part by weight of an antioxidant, tetrakis [methylene(3,5-di-tert butyl-4-hydroxyhydrocinnamate)]methane is kneaded at 100° C for 10 minutes in a Brabender mixer and further kneaded in the mixer for 20 minutes at 170° C. It is then compression formed into a 1 millimeter thick sheet. The sheet has a melt index of 35 grams per 10 minutes; a tensile strength of 70 kilograms per square centimeter; an elongation of 300 percent; and exhibits substantially no blooming. The sheet is pelletized and extruded into a tape at 170° C.

EXAMPLE 2

Example 1 is repeated without the dicumyl peroxide; however, the kneader slipped and a homogeneous product could not be formed.

EXAMPLE 3

Example 1 is repeated except (i) 25 parts by weight of 1,14 tetradecadiene are used instead of the 1,9-decadiene; (ii) the viscosity is 24,600 centistokes at 25° C.; (iii) the melt index of the ethylene/vinyl acetate copolymer is 1.5 grams per 10 minutes and the vinyl acetate content is 15 percent by weight; (iv) 3 parts by weight of dicumyl peroxide are used; (v) 1 part of antioxidant is used; and (vi) the sheet has a tensile strength of 90 kilograms per square centimeter.

EXAMPLE 4

Example 1 is repeated except (i) the polymer is an ethylene/1 butene copolymer having a melt index of 4.7 grams per 10 minutes and a density of 0.900 gram per cubic centimeter; (ii) 30 parts by weight of the polyorganosiloxane are used; (iii) the sheet has a melt index of 40 grams per 10 minutes, a tensile strength of 80 kilograms per square centimeter, and an elongation of 600 percent.

EXAMPLE 5

Example 1 is repeated except (i) 25 parts by weight of 1,9 decadiene are used; (ii) the pellets are formed into at 70 micron thick inflated film at an extrusion temperature of 170° C and a blow ratio of 1:6 using a 40 millimeter screw extruder having a length to diameter ratio of 24; and (iii) the inflated film has a rupture strength of about 220 kilograms per square centimeter.

EXAMPLE 6

Example 4 is repeated except (i) the pellets are formed at 190° C. into a 10 millimeter outer diameter and a 2 millimeter thick tube using a 20 millimeter diameter extruder having a length to diameter ratio of 24 and (ii) the tube has a rupture strength of about 200 kilograms per square centimeter.

We claim:
1. A composition comprising:
   (i) a crosslinkable thermoplastic
   (ii) an organic peroxide crosslinkinq agent; and
   (iii) a linear polyorganosiloxane the following recurring unit:

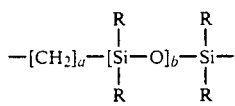

wherein

R is a saturated aliphatic or aromatic group and each R can be alike or different;

a is 5 to about 100;

b is about 1 to about 1000; and the polyorganosiloxane is terminated at the $[CH_2]_a$ end with $-CH=CH_2$ or hydrogen and at the

end with $-[CH_2]_a-CH=CH_2$ or hydrogen provided that at least one $-CH=CH_2$ is present.

2. The composition defined in claim 1 wherein the thermoplastic resin is a homopolymer or copolymer of ethylene and one or more alpha-olefins or unsaturated esters.

3. The composition defined in claim 2 in the crosslinked state.

4. The composition defined in claim 2 wherein R has 1 to 10 carbon atoms.

5. The composition defined in claim 2 wherein the subscript a is about 8 to about 13 and the subscript b is 8 to 200.

6. The composition defined in claim 2 wherein the polyorganosiloxane is terminated at both ends with a $-CH=CH_2$ group.

7. The composition defined in claim 2 wherein for each 100 parts by weight of thermoplastic resin there are about 0.1 to about 10 parts by weight of organic peroxide crosslinking agent and about 0.01 to about 300 parts by weight polyorganosiloxane.

8. The composition defined in claim 7 wherein the organic peroxide is present in an amount of about 0.5 to about 3 parts by weight and the polyorganosiloxane is present in an amount of about 0.05 to about 100 parts by weight.

9. The composition defined in claim 2 wherein the number of recurring units is in the range of about 1 to about 2.

10. An electrical conductor coated with the composition defined in claim 3.

11. An article of manufacture in the form of a film, sheet, or tube comprising the composition defined in claim 3.

12. An article of manufacture comprising an electrical conductor and at least one layer surrounding the conductor comprising the composition defined in claim 3.

* * * * *

UNITED STATES PATENT AND TRADEMARK OFFICE
CERTIFICATE OF CORRECTION

PATENT NO. : 5,037,887

DATED : August 6, 1991

INVENTOR(S) : Senuma et al

It is certified that error appears in the above-identified patent and that said Letters Patent is hereby corrected as shown below:

Column 5, line 15, after "thermoplastic", insert -- resin; --;

line 17, after "polyorganosiloxane", insert - - having - -; and line 29, delete "about".

Column 6, line 12, delete "about" (both occurrences); line 13, before "8" and before "200", insert -- about --; and line 28, delete "about".

Signed and Sealed this

Fifth Day of January, 1993

Attest:

DOUGLAS B. COMER

Attesting Officer

Acting Commissioner of Patents and Trademarks